United States Patent Office 3,124,450
Patented Mar. 10, 1964

3,124,450
PURIFICATION OF METALS
Richard K. Matuschkovitz, Chicago, and Henning J. Christensen, Addison, Ill., assignors to Chemetron Corporation, Chicago, Ill., a corporation of Delaware
No Drawing. Filed Jan. 13, 1961, Ser. No. 82,405
5 Claims. (Cl. 75—57)

This invention relates to a method for reducing the sulfur content of iron produced in cupola furnaces. More particularly, this invention relates to a method of refining iron by the addition of calcium carbide to the sand bottom of a cupola prior to the charging and ignition of the coke bed.

Shaft furnaces, such as cupolas, have been used for the production of cast iron by melting pig iron, scrap iron and steel with fluxing materials, the heat being supplied by the combustion of coke with air blown into the cupola through tuyeres. In ordinary practice the cupola is first filled with coke to some distance above the tuyere level and this coke is ignited and burnt in. When the coke is white hot, charging begins and the melting operation is started. Layers of limestone and pig iron and scrap iron and steel are placed above the coke bed with alternative layers of coke to replace the coke which burns out during the operation. As the iron charge descends in the cupola, the metal becomes soft and finally melts in the melting zone which is the hottest zone immediately above the tuyere level. Liquid superheated iron flows around the coke pieces in the coke bed and is collected in the well of the cupola from where it is tapped through the tap hole.

The Carter Patent No. 2,643,185 discloses that the addition of a relatively small amount of calcium carbide to the cupola charge is effective in reducing the sulfur content of the iron. The Timmerbeil et al. Patent No. 2,865,735 discloses an improvement whereby calcium carbide whose melting point is lower than 1800° C. is introduced into the cupola as part of the charge. These techniques have produced substantial improvements in the desulfurization of iron but they have certain inherent disadvantages, one of which is that the procedure is not effective until several charges have been passed through the cupola. Furthermore, the calcium carbide reacts with the iron in the melting zone of the cupola and part of the calcium carbide is oxidized and creates heat which increases the melting zone temperature, which results in a higher carbon pickup and higher melting rate. In addition the contact between the molten iron and the calcium carbide in the melting zone and above is somewhat inefficient with the result that the molten iron is not efficiently desulfurized.

It is the object of this invention to provide an efficient method for desulfurizing iron. It is a further object of this invention to provide a method for efficiently desulfurizing iron with calcium carbide which is immediately effective with the first charge. These and other objects are apparent from and are achieved in accordance with the following disclosure.

We have discovered that iron can be efficiently desulfurized by reaction with calcium carbide below the tuyere zone of the cupola. Calcium carbide introduced at or near the sand bottom of the cupola below the coke bed makes thorough contact with the molten iron after it has descended through the heating zone of the cupola and reacts effectively with the sulfur contained in said iron to remove it from the iron. The reaction takes place rapidly at the temperature of the molten iron, which is in the range of 2800–3100° F. This procedure is effective in desulfurizing the first charge of iron melted in the cupola and continues efficiently throughout the entire cupola run.

Preferably the calcium carbide is introduced in waterproof paper bags which are placed on the sand bottom of the cupola so as to cover the entire area. When the sand bottom of the cupola is covered, approximately 100–200 lbs. of calcium carbide is used. As approximately 7–8 lbs. of calcium carbide is required to desulfurize a ton of iron, this procedure provides an excess of calcium carbide for each charge. Intimate contact between molten metal and calcium carbide takes place near the bottom of the cupola prior to the withdrawal of the metal through the tap hole. The desulfurization which occurs in this way is far superior to the post cupola carbide injection procedure because in the latter the calcium carbide, due to its low density, floats on top of the iron; often only a surface melting reaction of the carbide takes place and the desulfurizing effect is low. Also, as pointed out above, the desulfurization is more effective than that obtained by adding calcium carbide to the cupola charge because in that procedure the contact between molten metal and calcium carbide is transitory and incomplete. In the procedure of this invention, however, the carbide is completely contacted with the iron and the desulfurization effect is much greater than ordinary.

In the production of iron, an acid-lined cupola is preferred because of lower operating costs. Iron produced in an acid-lined cupola has a sulfur content of about 0.075% when using a special charge and the sulfur content is reduced to lower levels by adding magnesium or cerium alloys when producing ductile iron. By the procedure of this invention the sulfur content of the base iron can be reduced from about 0.075% to about 0.04% by reaction with calcium carbide and thus the amount of magnesium or cerium alloys required for complete desulfurization are reduced almost in half, thereby providing significant savings. Greatly improved sulfur removal is achieved by addition of calcium carbide in the cupola bottom when compared to the addition of calcium carbide to the charge as disclosed in the Carter and Timmerbeil et al. patents cited above.

The desulfurization reaction continues for about three hours. The calcium carbide may be replenished on the sand bottom. This replenishment can be achieved by mechanical means through a hole close to the cupola bottom through which in some cupola operations a burner is inserted to ignite the coke bed before starting the charging and melting operation. Another way is to replenish the calcium carbide through the tap hole by mechanical means. During these operations described above, the melting operation of the cupola is interrupted. The calcium carbide in fine particle size (from dust to particles of ¼ inch maximum) can also be fed into the well of the cupola below the combustion (tuyere) zone by entrainment in a stream of inert gas (nitrogen, argon or helium) through a hopper feeder. Preferably the calcium carbide is blown into the molten iron by the stream of inert gas just on top of the melt or below the surface.

The invention is disclosed in more detail by the following examples which are provided for purposes of illustration only. It will be evident that numerous modifications may be made in operating conditions and quantities of materials without departing from the invention as disclosed herein.

EXAMPLE 1

A number 3 acid-lined cupola furnace was charged with subsequent charges each consisting of 150 lbs. of pig iron, 200 lbs. of scrap returns, 140 lbs. of scrap iron, 50 lbs. of scrap steel, 65 lbs. of coke and 15 lbs. of limestone. 120 to 150 lbs. of calcium carbide (size 3 x ½ in.) in loose form was placed on the bottom of the furnace prior to charging wood, paper and coke. The coke bed was then ignited in its normal way and the coke bed was burnt in. Normal cupola practice was followed thereafter. Molten iron was tapped intermittently in the transfer ladle of about 750 lbs. capacity and this iron was then poured into smaller pouring ladles. Metal from the first tap was used to preheat the ladles and was then pigged. Metal from the succeeding taps was poured into molds to produce castings. The cupola operating cycle was from 2 to 2½ hours. The following results were obtained:

*120 Lbs. Calcium Carbide Addition Below the Coke Bed*

| Time After Tap 1 (Min.) | Tap No. | Temperature, °F. | Analysis | | | Remarks |
|---|---|---|---|---|---|---|
| | | | C | Si | S | |
| 0 | 1 | | | | .115 | 200 lb. pigged open slag hole. |
| 5 | | | | | | |
| 8 | 2 | 2,640 | | | .055 | |
| 14 | 3 | 2,750 | 3.53 | 2.40 | .065 | |
| 20 | 4 | 2,840 | | | .047 | |
| 26 | 5 | 2,820 | | | | |
| 31 | 6 | 2,810 | | | .056 | |
| 35 | 7 | 2,780 | | | | |
| 40 | 8 | 2,760 | | | .063 | |
| 44 | 9 | 2,770 | | | | |
| 49 | 10 | 2,790 | | | .051 | |
| 54 | 11 | 2,780 | | | | |
| 59 | 12 | 2,795 | | | .049 | |
| 63 | 13 | 2,780 | | | | |
| 67 | 14 | 2,780 | | | | |
| 72 | 15 | 2,790 | | | | |
| 75 | 16 | 2,800 | 3.29 | 2.42 | .078 | |
| 81 | 17 | 2,800 | | | | |
| 85 | 18 | 2,800 | | | .067 | |
| 89 | 19 | 2,760 | | | | |
| 93 | 20 | 2,770 | | | .068 | |
| 98 | 21 | 2,790 | | | | |
| 101 | 22 | 2,780 | | | | |
| 105 | 23 | 2,760 | | | .069 | |
| 111 | 24 | 2,780 | | | .078 | |
| 115 | 25 | 2,790 | | | | |
| 119 | 26 | 2,790 | | | .060 | |
| 124 | 27 | 2,790 | | | | |
| 129 | 28 | 2,780 | | | | |
| 133 | 29 | | 3.29 | 2.20 | .088 | |
| 137 | 30 | | | | .082 | |
| 144 | | | | | | |
| 145 | 31 | | | | .104 | Blast off. |
| Average | | | | | .068 | |

EXAMPLE 2

A similar run made in the same furnace under the same conditions as Example 1, except that calcium carbide (2% of the iron weight charged) was mixed with each charge, gave the following results:

| Time After Tap 1 (Min.) | Tap No. | Temperature, °F. | Analysis | | | Remarks |
|---|---|---|---|---|---|---|
| | | | C | Si | S | |
| 0 | 1 | 2,550 | | | | 200 lbs. pigged. |
| 15 | 2 | 2,740 | | | | |
| 23 | 3 | 2,810 | 3.86 | 2.44 | .072 | |
| 29 | 4 | 2,820 | | | | |
| 35 | 5 | 2,760 | 3.54 | 2.32 | .084 | |
| 40 | 6 | 2,770 | | | | |
| 44 | 7 | 2,750 | 3.50 | 2.40 | | |
| 49 | 8 | 2,730 | | | | |
| 53 | 9 | 2,750 | | | | |
| 59 | 10 | 2,740 | 3.40 | 2.45 | .088 | |
| 63 | 11 | 2,750 | | | | |
| 65 | | | | | | |
| 69 | 12 | 2,730 | | | | |
| 74 | 13 | 2,740 | 3.39 | 2.27 | .080 | |
| 79 | 14 | 2,740 | | | | |
| 84 | 15 | 2,730 | 3.26 | | | |
| 88 | 16 | 2,735 | 3.18 | | | Wait on ladle. |
| 91 | 17 | 2,700 | | | | Do. |
| 92 | | | | | | Blast off. |
| 97 | 18 | 2,700 | | | | |
| Average | | | | | .081 | |

EXAMPLE 3

Another run similar to Example 1 using the same charge and having 150 lbs. of calcium carbide in five waterproofed paper bags covering the sand bottom of the cupola gave the following results:

| Time After Tap 1 (Min.) | Tap No. | Temperature, °F. | Analysis | | | Remarks |
|---|---|---|---|---|---|---|
| | | | C | Si | S | |
| 0 | 1 | | | | .099 | Open slag hole. |
| 3 | | | | | | |
| 9 | 2 | 2,690 | | | | |
| 16 | 3 | 2,790 | 3.52 | 2.56 | .063 | |
| 21 | 4 | 2,830 | | | .051 | |
| 29 | 5 | 2,840 | | | | |
| 35 | 6 | 2,810 | | | .056 | |
| 41 | 7 | 2,800 | | | | |
| 47 | 8 | 2,810 | | | .054 | |
| 53 | 9 | 2,790 | | | | |
| 59 | 10 | 2,780 | 3.34 | 2.43 | .071 | |
| 66 | 11 | 2,780 | | | | |
| 75 | 12 | 2,800 | | | | |
| 82 | 13 | 2,800 | | | .069 | |
| 91 | 14 | 2,830 | | | | |
| 98 | 15 | 2,840 | | | | |
| 104 | 16 | 2,850 | | | .079 | |
| 112 | 17 | 2,820 | | | | |
| 118 | | | | | | Blast off. |
| 120 | 18 | 2,790 | | | .090 | Blast on. |
| 122 | | | | | | Blast off. |
| 124 | | | | | | |
| 125 | 19 | 2,760 | 3.53 | 2.45 | .092 | |
| Average | | | | | .072 | |

EXAMPLE 4

A series of 16 charges were melted in a No. 5 acid-lined cupola lined to 48 inches. On the sand bottom of the cupola below the coke bed 180 lbs. of calcium carbide in six waterproofed paper bags were distributed so as to cover the bottom. Each charge had the following constituents:

| | Lbs. |
|---|---|
| Steel | 350 |
| Returns | 300 |
| Malleable pig iron | 200 |
| Cast scrap | 350 |
| Limestone | 45 |
| Coke | 140 |

In the procedure the sand bottom of the cupola was covered with six bags containing 180 lbs. of calcium carbide. Wood and coke were then placed on top of the calcium carbide and ignited. The coke was then "burned in" in a normal manner. The coke bed was adjusted to compensate for the material put on the bottom and normal cupola practice was followed thereafter. Molten iron was tapped intermittently into various ladles and poured off.

The calcium carbide used was of the size of 3 x ½ in. and dust free. The following results were obtained:

| Day | Time After Tap 1 (Min.) | Tap No. | Pounds Tapped | Percent S |
|---|---|---|---|---|
| 1 | 0 | 1 | 2,600 | .068 |
| | 16 | 2 | 1,400 | .076 |
| | 24 | 3 | 1,400 | .075 |
| | 37 | 4 | 1,400 | .069 |
| | 50 | 5 | 1,400 | .065 |
| | 59 | 6 | 1,400 | .075 |
| | 69 | 7 | 1,400 | .079 |
| | 78 | 8 | 1,400 | .074 |
| | 86 | 9 | 1,400 | |
| | 96 | 10 | 1,400 | |
| | 108 | 11 | 1,400 | .096 |
| 2 | 0 | 1 | 2,400 | .085 |
| | 16 | 2 | 2,400 | .077 |
| | 36 | 3 | 1,400 | .062 |
| | 44 | 4 | 1,400 | .064 |
| | 60 | 5 | 1,400 | .068 |
| | 69 | 6 | 1,400 | .077 |
| | 79 | 7 | 1,400 | .078 |
| | 89 | 8 | 1,400 | .076 |
| | 100 | 9 | 1,400 | .069 |

In normal practice the average sulfur content of the iron produced with the same charge was 0.116%. By the use of calcium carbide at the bottom of the cupola in accordance with this example, the average sulfur content was 0.075% or a 35% reduction compared to normal practice. Besides desulfurization, other advantages obtained through the use of calcium carbide at the bottom of the cupola include higher iron tapping temperature, better fluidity of iron and slag and cleaner iron.

EXAMPLE 5

360 lbs. of calcium carbide in waterproofed paper bags (12 bags) were placed on the sand bottom of a No. 8, 60 in. diameter, acid-lined cupola. During the first half of the cupola operation ductile iron was produced; in the second half normal type grey iron. The charges were adjusted accordingly. Without the desulfurization process, base iron suitable for ductile iron had an average sulfur content of 0.75%, and the grey iron of 0.115%. The base iron for ductile iron was then treated with magnesium or cerium alloys to reduce the sulfur content to a level of about 0.01%, thus producing ductile or nodular iron.

In the following results, obtained with the calcium carbide desulfurization, it is seen that the sulfur content of the base iron as tapped for the ductile iron production was decreased from 0.075% to 0.044% sulfur on the average. The savings in magnesium alloys to bring the sulfur further down are very significant as compared to normal practice. The sulfur content of grey iron, which was produced after the ductile iron, was reduced from 0.115% to 0.091%.

| Iron Produced | Time After Tap 1 (Min.) | Tap No. | Percent S |
|---|---|---|---|
| Grey Iron | | 1 | .065 |
| Ductile Iron | 17 | 2 | .046 |
| Do | 28 | 3 | .042 |
| Do | 41 | 4 | .040 |
| Do | 52 | 5 | .042 |
| Do | 61 | 6 | .045 |
| Do | 71 | 7 | .046 |
| Do | 81 | 8 | .047 |
| Do | 87 | 9 | .048 |
| Do | 99 | 10 | .046 |
| Average | | | .044 |
| Grey Iron | 112 | 11 | .072 |
| Do | 128 | 12 | .096 |
| Do | 138 | 13 | .102 |
| Do | 147 | 14 | .096 |
| Do | 160 | 15 | .092 |
| Average | | | .091 |

What is claimed as new and is desired to be secured by Letters Patent of the United States is:

1. Method of desulfurizing iron which comprises forming a layer of calcium carbide on the bottom of a cupola furnace below the coke bed and the tuyere level of the furnace, continuously melting iron in the melting zone of the cupola, continuously flowing the resultant molten iron downward below the tuyere level into the well of the cupola where it contacts the calcium carbide, the calcium carbide being in the form of solid pieces through which the molten iron circulates, thereby causing intimate contact between the molten iron and the calcium carbide to diminish the sulfur content of the iron by reaction with said calcium carbide, then removing said molten desulfurized iron from contact with the said calcium carbide by withdrawing the iron from the cupola.

2. Method of claim 1 wherein the molten iron is at a temperature of about 2800–3100° F.

3. Method of claim 2 wherein at least 7 lbs. of calcium carbide is used per ton of iron.

4. The method of claim 1 wherein the calcium carbide is in waterproof paper bags and covers the entire bottom of the cupola.

5. The method of claim 4 wherein the calcium carbide is in pieces approximately 3 inches by ½ inch in dimension.

References Cited in the file of this patent

UNITED STATES PATENTS

| 1,335,370 | Ellis | Mar. 30, 1920 |
| 2,181,096 | Ness | Nov. 21, 1939 |
| 2,604,393 | Smalley | July 22, 1952 |
| 2,711,954 | West et al. | June 28, 1955 |
| 2,865,735 | Timmerbeil et al. | Dec. 23, 1958 |

FOREIGN PATENTS

| 286,527 | Italy | June 13, 1931 |